(12) United States Patent
Blanche et al.

(10) Patent No.: US 10,345,576 B2
(45) Date of Patent: Jul. 9, 2019

(54) DIFFRACTION-BASED LIGHT BEAM SCANNER

(71) Applicant: ARIZONA BOARD OF REGENTS ON BEHALF OF THE UNIVERSITY OF ARIZONA, Tucson, AZ (US)

(72) Inventors: Pierre Alexandre Blanche, Tucson, AZ (US); Brittany Lynn, Tucson, AZ (US)

(73) Assignee: ARIZONA BOARD OF REGENTS ON BEHALF OF THE UNIVERSITY OF ARIZONA, Tucson, AZ (US)

( * ) Notice: Subject to any disclaimer, the term of this patent is extended or adjusted under 35 U.S.C. 154(b) by 0 days.

(21) Appl. No.: 16/086,410

(22) PCT Filed: Apr. 5, 2017

(86) PCT No.: PCT/US2017/026174
§ 371 (c)(1),
(2) Date: Sep. 19, 2018

(87) PCT Pub. No.: WO2017/176901
PCT Pub. Date: Oct. 12, 2017

(65) Prior Publication Data
US 2019/0107711 A1  Apr. 11, 2019

Related U.S. Application Data

(60) Provisional application No. 62/319,724, filed on Apr. 7, 2016.

(51) Int. Cl.
*G02B 26/08* (2006.01)
*G02B 26/10* (2006.01)

(52) U.S. Cl.
CPC ..... *G02B 26/0808* (2013.01); *G02B 26/0833* (2013.01); *G02B 26/101* (2013.01); *G02B 26/106* (2013.01)

(58) Field of Classification Search
CPC  G02B 26/0808; G02B 26/101; G02B 26/106; G02B 26/0833
USPC ........................ 359/237, 238, 290
See application file for complete search history.

(56) References Cited

U.S. PATENT DOCUMENTS

| | | | |
|---|---|---|---|
| 6,978,062 B2 * | 12/2005 | Rose ................ | G02B 6/29311 385/15 |
| 2002/0191394 A1 | 12/2002 | Coleman et al. | |
| 2011/0188120 A1 | 8/2011 | Tabirian et al. | |
| 2014/0130843 A1 | 5/2014 | Kostuk et al. | |
| 2017/0115435 A1 * | 4/2017 | Tabirian ............... | G02B 5/1833 |

OTHER PUBLICATIONS

Yoo, B.W., "A 32 x 32 Optical Phased Array Using Polysilicon Sub-Wavelength High-Contrast-Grating Mirrors," Opti Express, vol. 22, No. 16, Aug. 11, 2014, 11 pages.

* cited by examiner

*Primary Examiner* — Tuyen Tra
(74) *Attorney, Agent, or Firm* — Yakov S. Sidorin; Quarles & Brady LLP (57) ABSTRACT

System and method utilizing a reconfigurable in real-time phase-modulating diffractive device (in a specific case—a 2D array of micro-mirror elements) in conjunction with another diffractive element (active or passive) to spatially steer a beam of polychromatic light such that light reaches the identified target without being substantially angularly dispersed.

13 Claims, 8 Drawing Sheets

DIFFRACTION-BASED LIGHT BEAM SCANNER

CROSS-REFERENCE TO RELATED APPLICATIONS

The present application represents the U.S. National Stage entry of PCT/US2017/026174, filed on Apr. 5, 2017, and claims priority from and benefit of the U.S. Provisional Patent Application No. 62/319,724, titled "Diffraction-Based MOEMS Scanner and Method for Relaying Light With Same", filed on Apr. 7, 2016. The disclosure of each of the above-identified patent applications is incorporated herein by reference.

TECHNICAL FIELD

The present invention relates to non-mechanical ways of steering a laser beam and/or acquiring scattered light with the use of a MOEMS-based diffractive device and, in particular, a method for dynamically (in real time) reconfigurable compensation of spatial dispersion of polychromatic light propagating through such device by intentional and judicially-chosen worsening of optical characteristics of the polychromatic light.

BACKGROUND

Figure 1:
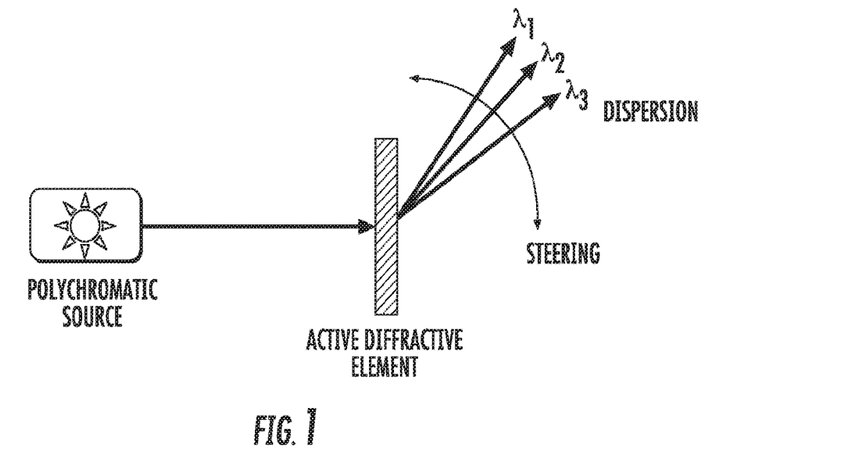
FIG. 1 schematically illustrates that an electrically-controlled optical diffractive element can steer a polychromatic beam, but the output beam is subject to spectral dispersion caused by polychromatic content of the light beam.

Lidar and related applications continue to present an unsatisfied need in broadband, random access, non-mechanical beam steering devices. A conformal, thin, broadband and rapid beam steering device is thought of as a vehicle to overcoming the recognized disadvantages of traditional optical systems and electro-optical beam steering devices, which use heavy and power-hungry gimbals and optical components making large mechanical motions. While various non-mechanical optical beam steering devices have been demonstrated, most of such devices utilize electrically-controlled optical diffraction elements such as, for example, an LCoS (that is, a liquid-crystal-on-silicon) based contraption and/or a MEMS (micro-electro-mechanical) based system to steer the optical beam in space. Each of these elements represents an actively-operated (or active) diffractive element. These spatial light modulator (SLM) devices normally operate over a corresponding narrow wavelength band (referred to herein interchangeably as "wavelength spectrum" or simply "spectrum" of operation of the device). Since the diffraction-effect-induced steering angle ($\theta d$) relates to the wavelength of the incident light ($\lambda$) via the grating equation $$\sin \theta d - \sin \theta i = m\lambda\Lambda \quad (1),$$

where $\theta i$ is the incidence angle, m an integer number defining the diffraction order, and $\Lambda$ is the grating spacing (period), the polychromatic light diffracted upon interaction with (or at) such device is spatially dispersed, as is schematically illustrated in FIG. 1. Put differently, the polychromatic light is spread angularly in accordance with its spectral contents.

The observed effect of dispersion can be expressed, based on the grating equation, as $$d\lambda/d\theta d = \Lambda \cos \theta d/m \quad (2)$$

This fundamental property that polychrotnatic light disperses angularly upon interaction with an active diffractive element, according to spectral contents of polychromatic light inevitably limits the operation of any diffraction-based beam-steering device to narrow spectral band applications.

Considering that new types of laser sources—such as, for example, frequency comb pulsed lasers and supercontinuum lasers—require spectrally-broadband operation (in order to effectuate, for example, hyperspectral light detection and ranging, LIDAR, systems), the availability of broadband-spectrum-adapted beam-steering devices capable of supporting the required spectrally-broadband operation of the laser light source may facilitate the enablement of new LIDAR applications.

SUMMARY

Embodiments of the invention solve a problem of wavelength-dependent spatial dispersion of the light output, which output was produced due to diffraction of light at an SLM-type optical-beam-steering unit and which was caused by a finite spectral bandwidth characterizing a light beam incident onto the SLM-type optical-beam-steering unit. The solution is rooted in judicious modification and/or change of at least one of the optical quality and spectral quality of such light beam as compared to that (or those) of the initial state of the incident light.

As part of the solution, embodiments of the invention provide a method for relaying a light beam through an optical system. Such method includes impinging a first polychromatic light beam having a first degree of divergence and a first wavelength spectrum onto a first diffractive element to produce a second polychromatic light beam having a second degree of divergence and a second wavelength spectrum, the second degree of divergence being different from the first degree of divergence, the first and second wavelength spectra being substantially equal. The method further includes a step of interacting, upon such impinging, the second polychromatic light beam with a second diffractive element to form a third polychromatic light beam having a third wavelength spectrum and a third degree of divergence, the second and third wavelength spectra being substantially equal, the first and third degrees of divergence in space being substantially equal.

A related embodiment provides a method for relaying a light beam through an optical system. The method includes sequentially diffracting light of a polychromatic beam at first and second diffractive elements that are disposed in optical communication with one another; the first diffractive element being configured to form a first diffracted beam a chosen dimensional descriptor of which is different from a corresponding second dimensional descriptor of the polychromatic beam; the second diffractive element being configured to restore the value of said first geometrical descriptor to that of the second dimensional descriptor while keeping a wavelength spectrum of light contained in the polychromatic beam substantially unchanged upon propagation of said light through said optical system.

Yet another embodiment provides a method for relaying a light beam through an optical system, in which the following steps are taken: (i) a step of changing a degree of divergence of a polychromatic beam having a polychromatic spectrum by forming a first light output as a result of diffraction of said polychromatic beam at a first diffraction element, where the first light output contains light at substantially all wavelengths present in the polychromatic spectrum; and (ii) a step of diffracting the first light output at a second diffractive element to form a second light output in which light at any wavelength from the spectrum propagates in the same direction with respect to a reference axis.

BRIEF DESCRIPTION OF THE DRAWINGS

The invention will be more fully understood by referring to the following Detailed Description of Specific Embodiments in conjunction with the Drawings, of which:

FIGS. 5A, 5B illustrate a monostatic embodiment of the proposed system. FIG. 5A: operation in transmission mode; FIG. 5B: operation in receiving (detection) mode;

Generally, the sizes and relative scales of elements in Drawings may be set to be different from actual ones to appropriately facilitate simplicity, clarity, and understanding of the Drawings.

For the same reason, not all elements present in one Drawing may necessarily be shown in another.

DETAILED DESCRIPTION

References throughout this specification to "one embodiment," "an embodiment," "a related embodiment," or similar language mean that a particular feature, structure, or characteristic described in connection with the referred to "embodiment" is included in at least one implementation of the present invention. Thus, appearances of the phrases "in one embodiment," "in an embodiment," and similar language throughout this specification may, but do not necessarily, all refer to the same embodiment. It is to be understood that no portion of disclosure, taken on its own and in possible connection with a figure, is intended to provide a complete description of all features of the invention.

Within this specification, implementations of the idea of the invention are described in a way that enables a clear and concise specification to be written, but it is intended and will be appreciated that implementations or embodiments may be variously combined or separated without parting from the scope of the invention. In particular, it will be appreciated that all features described in this disclosure are applicable to all aspects of the invention.

In addition, when the present disclosure describes features of the invention with reference to corresponding drawings (in which like numbers represent the same or similar elements, wherever possible), the depicted structural elements are generally not to scale, and certain components are enlarged relative to the other components for purposes of emphasis and understanding. It is to be understood that no single drawing is intended to support a complete description of all features of the invention. In other words, a given drawing is generally descriptive of only some, and generally not all, features of the invention. A given drawing and an associated portion of the disclosure containing a description referencing such drawing do not, generally, contain all elements of a particular view or all features that can be presented is this view, at least for purposes of simplifying the given drawing and discussion, and directing the discussion to particular elements that are featured in this drawing. A skilled artisan will recognize that the invention may possibly be practiced without one or more of the specific features, elements, components, structures, details, or characteristics, or with the use of other methods, components, materials, and so forth. Therefore, although a particular detail of an embodiment of the invention may not be necessarily shown in each and every drawing describing such embodiment, the presence of this particular detail in the drawing may be implied unless the context of the description requires otherwise. In other instances, well known structures, details, materials, or operations may be not shown in a given drawing or described in detail to avoid obscuring aspects of an embodiment of the invention that are being discussed. Furthermore, the described single features, structures, or characteristics of the invention may be combined in any suitable manner in one or more further embodiments.

Moreover, if the schematic flow chart diagram is included, it is generally set forth as a logical flow-chart diagram. As such, the depicted order and labeled steps of the logical flow are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow-chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Without loss of generality, the order in which processing steps or particular methods occur may or may not strictly adhere to the order of the corresponding steps shown.

The invention as recited in claims appended to this disclosure is intended to be assessed in light of the disclosure as a whole, including features disclosed in prior art to which references are made.

A problem of wavelength-dependent spatial dispersion of the light output, produced due to diffraction of light at an SLM-type optical-beam-steering unit (that is configured as a diffractive device imposing phase-modulation of a light wavefront incident upon it) and caused by a finite spectral bandwidth characterizing a light beam incident thereon, is solved by judiciously changing at least one of the optical quality and spectral quality of such light beam as compared to that of the initial state of the incident light. Such judicious modification of the quality of the incident beam is carried out prior to its interaction with the steering unit of interest, and may include a transformation of a substantially-collimated light beam to a substantially non-collimated light beam.

A goal of improving the quality of an output light beam, produced by an SLM-based device, which is configured to diffract light incident thereon to form and steer such output light beam, is achieved by employing an auxiliary diffractive element (in operational sequence with the SLM-based device used in an embodiment of the invention) to change the angular divergence characteristic of the output light beam as compared to that which the output light beam would have in absence of the auxiliary diffractive element. In one example, a polychromatic light beam intended to be spatially steered by the SLM device is first modified, prior to interaction with the SLM device, by diffraction at the auxiliary diffractive element that spatially spreads such beam over a larger area of the SLM device, according to the wavelength spectrum of the polychromatic beam. The second element (SLM device, for example) redirects all constituent portions of light at different wavelengths, as a result of diffraction, is a single, common for all constituent portions direction to form a now-substantially-collimated polychromatic beam and, if desired, further scans such collimated beam angularly. The common direction can be preselected by the user. SLM The idea of the present invention stems from the realization that an addition of a pre-dispersive element (that is, an optical element configured to disperse light incident onto the active diffractive beam-steering device or a scanning diffractive element) in front of such device or element (that is, before the light is incident upon such device or element) facilitates what is referred to as a "pre-correction" of the dispersion effect imposed onto the incident light by such device or element itself. A simplified schematic diagram of one possible implementation of the proposed concept, which utilizes a "pre-correction" with the use of a passive diffractive element (shown as a prism) that operates in a transmission mode, is presented in FIG. 2.

Figure 2:
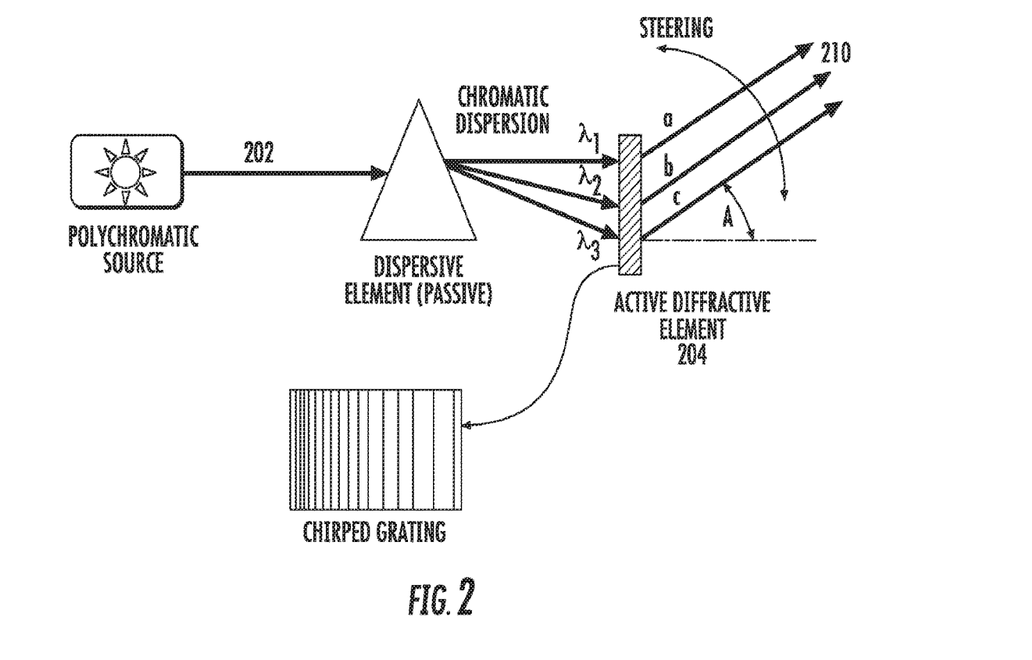
FIG. 2 is a schematic diagram of an embodiment of the invention employing a passive diffractive element in front of the active diffractive element.

Here, light 202 having a multiplicity of wavelengths and produced by the polychromatic source is dispersed angularly by a passive dispersive element such as a prism (or a grating, not shown), and portions of light 202 so-dispersed in correspondence to different wavelengths are incident at different angles (relative to the surface normal) on the active diffractive element (such as a DMD or an LCoS). To steer the beam in the desired direction, the active diffractive element 204 is configured to define a diffraction grating the surface of which is chirped (that is, such surface contains different spatial frequencies at different spatial locations) in either one or two dimensions (depending on the direction of steering required) so light portions at each and every wavelength contained within the spectrum of light incident onto the chirped grating are diffracted in the same, common direction with respect to a chosen axis.

As shown in the example of FIG. 2, the chosen axis may be a normal to the active surface of the diffractive device 204 and the common direction may be defined at an angle A with respect to such normal. Spectrally-different but propagating in the same direction light portions (a, b, c) aggregately form a single, substantially collimated polychromatic beam of light 210 exiting the device 204.

Figure 3:
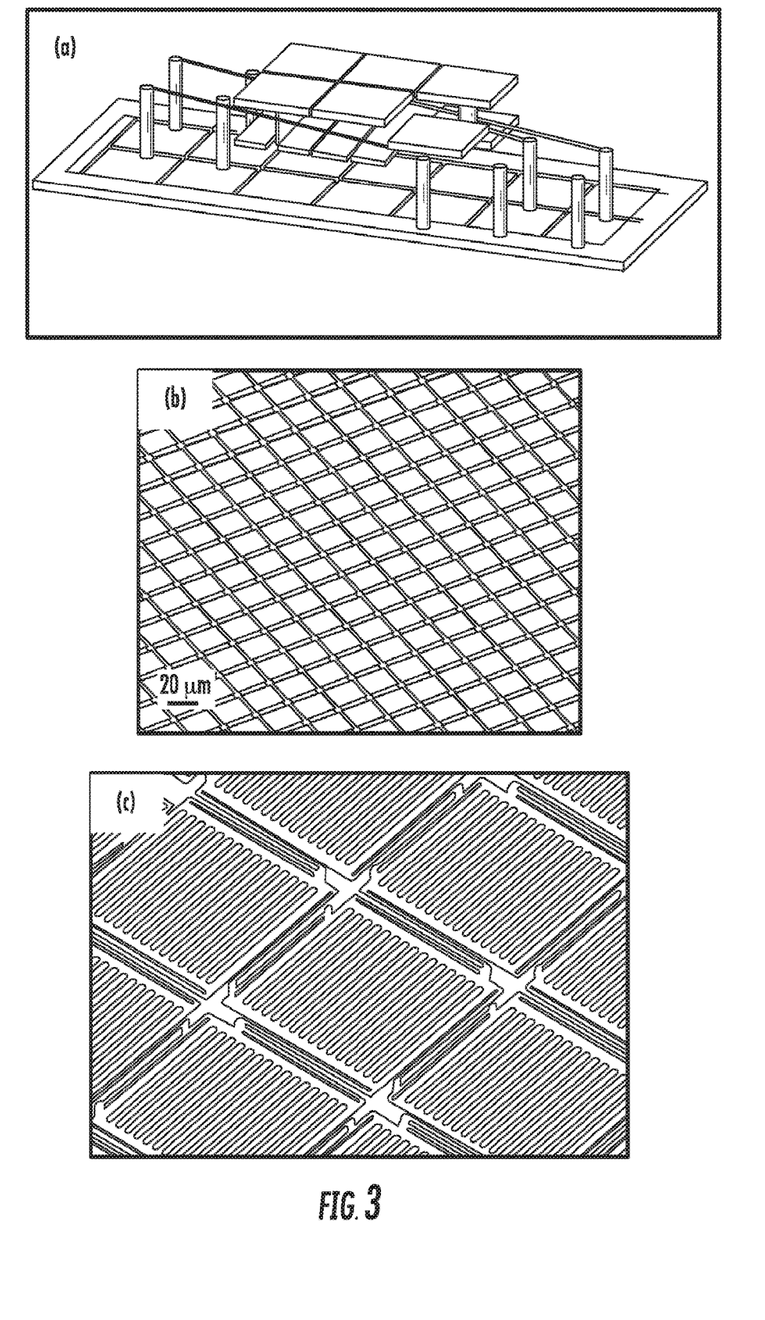
FIG. 3: (a) Schematic illustration (CAD design) of a piston-based SLM device; (b) SEM image of the 32×32 OPA (Optical Phase Array); (c) A close-up view of the OPA showing the high-contrast grating (HCG) mirrors at the micromechanical springs.

To spatially co-align the portions of the output beam 210 that correspond to different wavelengths from the spectrum of the beam 210, the spatial frequency of the grating formed at the device 204 is made to vary along a chosen direction in the plane of the grating based on position, incidence angle, and wavelength according to Eq.1. Since light at any wavelength from the spectrum of the incident polychromatic beam 202 is diffracted at the same angle, the portions of light carrying different wavelengths are then recombined in the far-field, thereby ensuring that operation of the overall device is achromatic. It is appreciated that in another embodiment—for example in one that utilizes a reflective diffractive device (such as the active surface of MOEMS defined by a multiplicity of the micro-reflectors, as shown in FIG. 3)—the overall system may be configured to operate in reflection.

Figure 4:
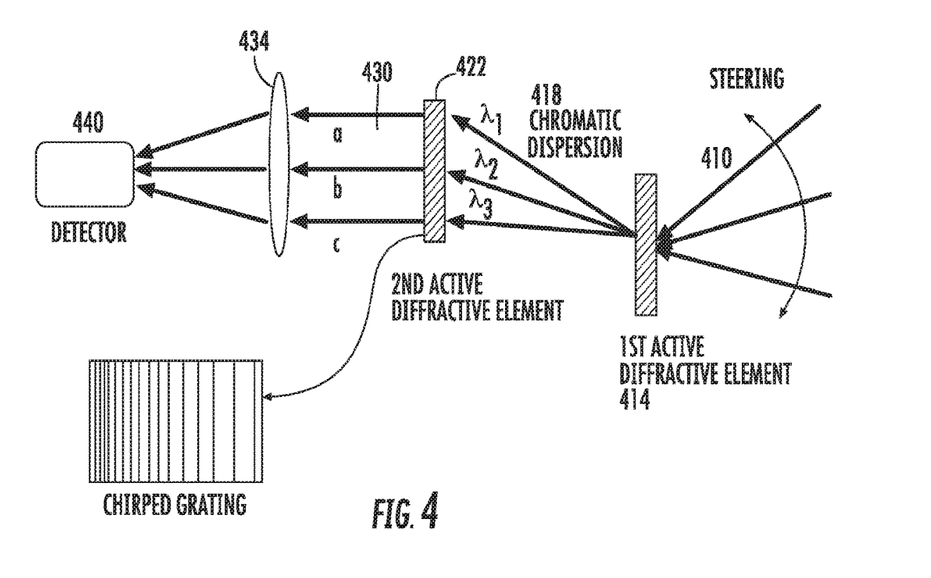
FIG. 4 is a schematic diagram of an embodiment configured for operation in receiving mode.

FIG. 4 illustrates a "receiving mode" of the operation of the embodiment of the invention, in which the polychromatic beam 410 is scattered back from a target, and then dispersed by the first active diffractive device 414. The spatial period of the diffraction grating contained by or at the device 414 is chosen to correspond to the angle of incidence of the beam 410 onto the device 414, but also to separate light 418 diffracted at the device 414 angularly, in accord with the spectral content of the beam 410. The chirping of the period of the diffraction grating defined by the second diffractive element 422 is judiciously chosen to have spectrally different portions of light distribution 418 re-collimated upon the diffraction of light 418 at the device 422 and to re-direct such portions along the same direction as parts of the substantially-collimated beam 430. Now spatially separated within the beam 430, the spectrally-different portions a, b, c of the collimated beam 430 are detected with the use of an optical detector system 440 (optionally, preliminarily recombined by a lens as shown) or detected with a detector unit to directly obtain the frequency spectrum.

In a specific implementation of a system configured for a one-directional propagation of light (such as the system of FIG. 4, for example), in which the light-converging optical element (such as a lens element 434) is additionally disposed between the second diffractive element 422 and the optical detector 440, the functions of the diffractive element and the light-converging element can be combined by utilizing a single optical device carrying both a 1D diffraction grating and a zone-plate.

The proposed approach can be generalized for a system operating in a transceiving mode (that is, a mode during which both receiving and transmitting of light—that is, a two-direction propagation of light—may occur; for example, for use in a monostatic LIDAR configuration). Unless specified otherwise, the term monostatic configuration is used to refer to an optical system (a train of operably connected optical components and devices) that is used both for receiving an optical signal and for transmitting the optical signal without requiring any reconfiguration. For example, monostatically configured optical system containing a diffractive element is structured to process (in a fashion specific to such optical system) light generated by a source of light that has been disposed in front of the optical system and acquire the light output from the optical system with a detector that has been disposed after the optical system and, at the same time, should the source of light and the detector be interchanged, to process in the same specific fashion light propagating through the system in the opposite direction without any repositioning of any elements of the optical system itself. In a specific case of the monostatically-configured optical system of the invention, both diffractive elements of the system are chosen to be active diffractive elements.

Figure 5A:
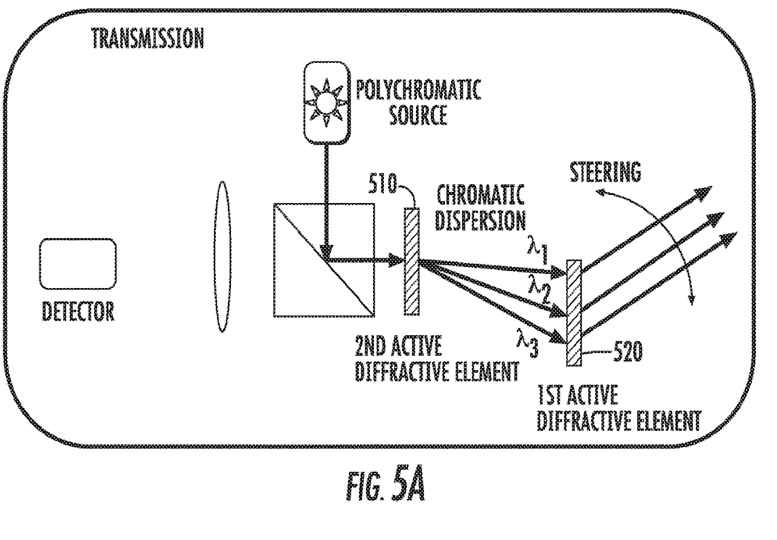
Figure 5B:
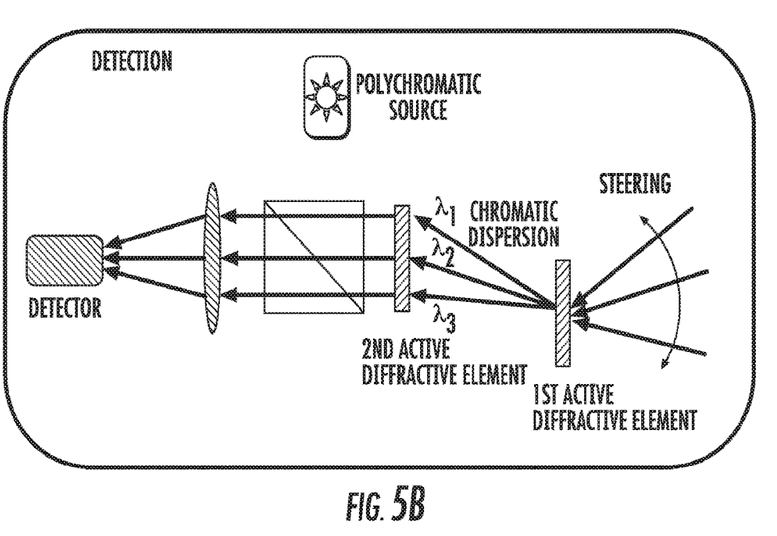

Conveniently, the device can be configured to be monostatic, that is to operate in a dual (transceiving) mode, as shown in FIGS. 5A, 5B, where light from the polychromatic source, arriving at the diffractive element(s) 510, 520, is steered or spatially scanned as desired by the appropriately adjusted diffraction pattern of the 2nd and/or 1st diffractive element(s) and redirected towards the not-shown target (FIG. 5A). Alternatively or in addition, when retrieved upon arrival from the target, the polychromatic beam is steered toward the single detector (FIG. 5B) as a result of counter-propagation of light through the system, during which sequential (but arranged in reversed order) interaction with the same diffractive elements 520, 510.

Figure 5C:
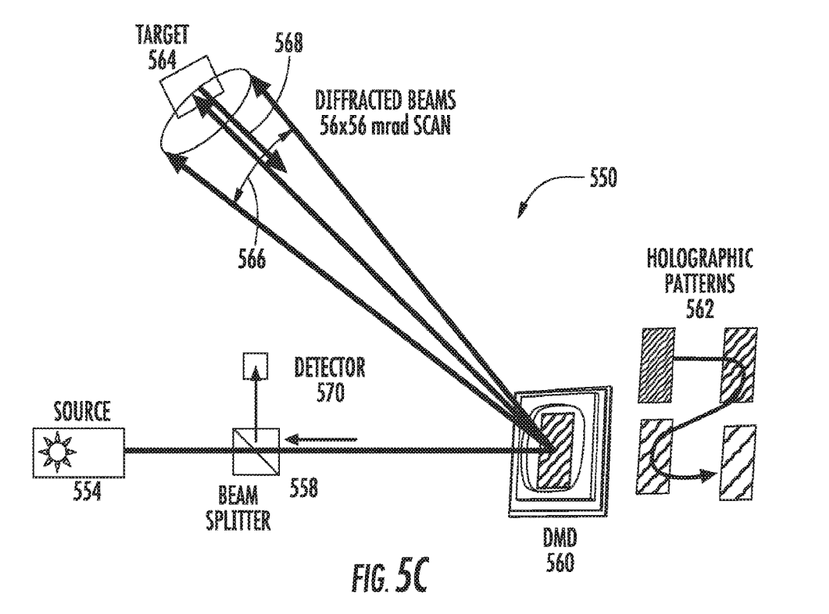
FIG. 5C is a schematic diagram of implementation demonstrating the experimental proof-of-concept of the idea of the invention: 2D scanning and coaxial monostatic configuration.

In a specific case, the steering or scanning pattern may be devised as schematically illustrated in FIG. 5C. Here, the actual optical system 550 is shown in a (co-axial) monostatic configuration corresponding to FIGS. 5A, 5B. The light from a source 554 traverses the beamsplitter 558 and is incident upon the DMD device 560, the operational characteristics of which are governed with a programmable processor (in operable communication with the device 560; not shown) to form at the device 560 a computer generated holographic pattern (for example, a pattern of reflection of light across the surface of the device, shown schematically in inset as 562). The pattern 562 diffracts the incident light at a specific angle towards the target 564. Scanning is achieved by rapidly displaying different pre-computed diffraction patterns on the device 560: When the device 560 is re-programmed to display a different, renewed pattern, the direction of propagation of the diffracted beam towards the target changes accordingly (whether in a spatially-continuous fashion, or in a spatially-discrete fashion when the angle of propagation of the diffracted beam with respect to a chosen reference axis changes abruptly, step-wise).

Light 568 reflected from the target is returned to the DMD device 560 and is diffracted by the same diffraction pattern along the input path, towards the beamsplitter 568, which in turn directs the return beam of light to a detector 570.

Figure 5D:
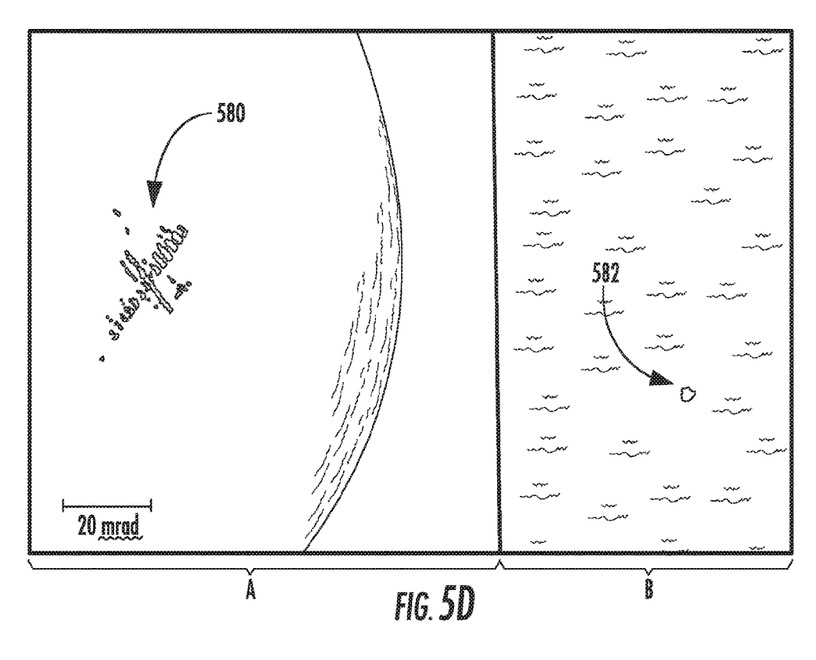
FIG. 5D: Image illustrating proof of concept of the use of the device of the invention, showing 2D scanning ability on the left (cross) and coaxial monostatic configuration signal retrieving on the right. The scanning point separation has been intentionally enlarged: finer definition is practically possible.

FIG. 5D shows a combination of two images (A and B), representing empirical results that demonstrate the 2D scanning ability of the monostatically-configured embodiment of the invention. Here, portion A of the image illustrates shows the area of the target of FIG. 5C that was being illuminated with the single beam (having a roundish cross-section) that was emitted by the source 554 and diffracted at the device 560 as a result of continuous reconfiguration of the pattern 562 (at a rate sufficiently high to capture the time-integrated change of irradiance across the target). It can be seen that, considering the "transmitting" mode of the transceiving operation of the optical system of FIG. 5C, the beam of light diffracted at the device 560 forms (as a result of spatial scanning) a "cross" 580 covering a spatial angle of approximately 20 mrad. The image 582 of portion B of FIG. 5D, representing a cross-section of a beam returned in reflection from the target, describes the optical signal collected by the detector 570 in a "receiving" fashion of the transceiving operation of the coaxially monostatically configured system of FIG. 5C. This experiment was performed a 532 nm visible-light laser source 554 to facilitate the image capture. However, the same optical system demonstrated similar performance at 1550 nm.

Example of Operational Characteristics of the Embodiment:

In reference to FIGS. 1, 2, 4, 5A, 5B, 5C, and 5D, it is appreciated that, in one embodiment, the system of the invention is configured to operate in the 1.1-1.6 micron range of wavelength. Alternatively, the system may be configured to operate in the visible and/or mid-IR spectral regions. The system performance characteristics and/or parameters include a 10 cm diameter aperture, a 60 degree field of steering in both angular dimensions (x- and y-), a greater-than 75% optical transmission efficiency, broadband operation over at least 10 percent of the spectral bandwidth, beam quality no worse than 3 times the diffraction limit, and <1 msec beam steering time (defined as time required for steering the beam output from the system from one extreme position to another extreme position).

Accordingly, in one specific implementation, the light source utilizes a supercontinuum laser (such as the NKT SuperK EXTREME laser). The beam from the fiber output of the laser is expanded with a telescope to a diameter covering the clear aperture of the diffractive element receiving this beam. In one specific case, the active diffractive element is the Holoeye LC-R 720 Spatial Light Modulator with a clear aperture of 25.6×15.4 mm$^2$, 1.18" diagonal, which requires a beam expansion from the supercontinuum fiber output from 2 mm diameter (at 1100 nm) to about 15 mm diameter, or seven-fold. Considering the Holoeye LCoS SLM is a device operating in reflection, the device is set at an angle with respect to the beam incident/incoming from the laser source to redirect the light away from the incoming beam. For example, at 45 degrees of incidence, the beam is reflected at 90 degrees with respect to the direction of incidence onto the active diffractive device. With the use of a diffraction grating carried by the active diffractive element, the beam is spatially spread according to its spectral components. For this specific LCoS SLM, the highest blazed grating spacing accessible with the use of a 5-phase level operation of the LCoS SLM is $$L=20 \text{ microns} * 5 = 100 \text{ microns},$$

or, 10 lp/mm frequency. The angle(s) corresponding to diffraction of light at different wavelengths can be assessed with the use of the Bragg's law $$\sin \alpha = \lambda/(2L),$$

which results in about 0.11 degree for the 400 nm light and about 0.67 degree for the 2350 nm light (or a 0.56 degree difference of spatial spread between light portions at the extreme wavelengths emitted by the source).

If the beam continues to propagate in free space after the diffractive element, it expands to the cross-sectional size of 15 mm (the size of the SLM clear aperture) after traveling about 1.5 meters. To reduce this distance, a lens can be used to make the beam expand faster. To collimate the beam at the second active diffractive device, the diffraction grating of such second device should be configured to take into account the angle of incidence of the beam, its wavelength, the location of the portion of the incident beam at that wavelength on the surface of the second diffractive device, and the desired scanning angle.

Assuming the continuous spectrum of light ranging from about 400 nm to about 2350 nm, and the complete coverage of the clear aperture of the second diffractive device with such incident light, the portion of light carrying the wavelength of 400 nm is incident onto one edge of the device while the portion of light carrying the wavelength of 2350 nm is incident onto the opposite edge of the device. Accordingly, the grating spacing should be about 100 microns for a diffraction angle of 0.11 degrees from the reflection angle for a 400 nm light, and about 612 microns for a diffraction angle of 0.11 degrees from its own reflection angle. Notably, since the 400 nm sub-beam portion and the 2350 nm sub-beam portion have different angles of incidence onto the second diffractive device, these portions also have different angles of reflection from the SLM. Once the maximum and minimum grating spacings have been computed as explained, a linear (or nonlinear) regression can be performed to obtain the grating frequency at any given point along the lateral axis of the SLM. After the diffraction from the last SLM device in line, the aggregate beam containing light at all wavelengths from the source-of-light output travels while substantially collimated with a diameter of about 15 mm (the size of a clear aperture of the SLM device) to the designated target. To change the direction of the beam propagation (that is, to effectuate scanning), a new diffraction pattern can be calculated to be defined and implemented with the last SLM (governed by the programmable processor) with the use of the Bragg's equation in accord with the desired angle value.

To correct various aberrations in the beam traveling to the designated target, the diffraction pattern displayed/implemented by the SLM can also incorporate the effect(s) of auxiliary optical function(s) such as the operation of a zone plate, a correction of astigmatism, or a correction of any higher-order aberration. So-programming the operation of the SLM facilitates a process of compensation of substantially any aberration induced by an optically-conformal spatial region (such as a region occupied by a conformal optical element) that may be present between the lidar optics and the free space travel of the beam and that the beam has to traverse.

In one implementation, the system is configured to be compatible with conformal windows on aircraft (i.e. windows that conform to the airframe surface). It is recognized that the presence of a conformal optical element or system induces optical aberrations. These aberrations once known or estimated, are compensated with an embodiment of the invention by having the wavefront judiciously changed, in a diffractive fashion as described, at the SLM. Beam steering approach to operation of the system of the invention includes bi-directionally—that is, the system is enabled to operate as an optical transmitter and/or an optical receiver (in other words, in a bidirectional mode).

Figure 6:
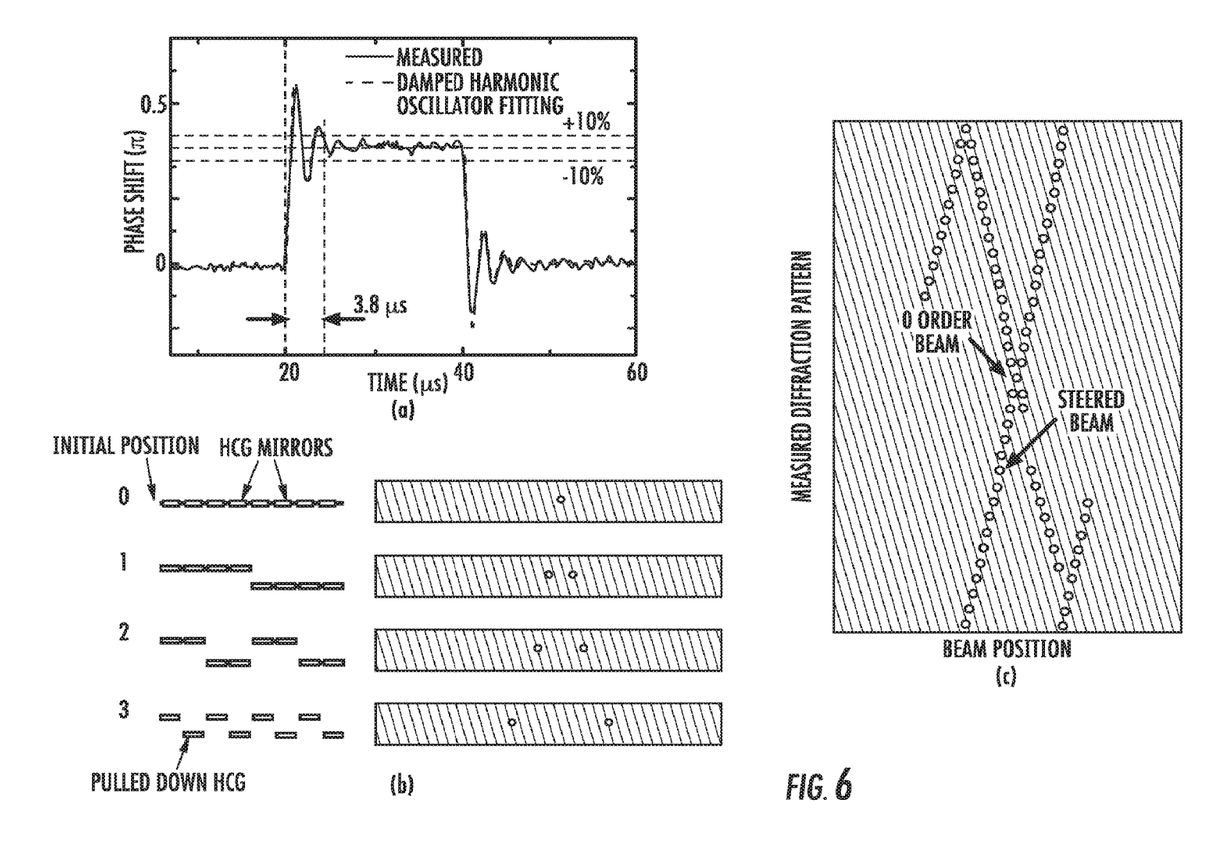
FIG. 6: measurement of a 3.8 microsecond mirror-stabilization time (a); position of the micromirrors and far-field diffraction spots obtained with the use of the device (b); and scanning ability of the OPA (c).

The targeted specifications of the system can be achieved at least in part as follows:

1. An aperture larger in size than the size of the (clear aperture of the) SLM element can be obtained by having a collecting lens in front of the diffractive elements. The diffractive element by itself can have an aperture of a few cm of diameter;

2. Two dimensional steering can be achieved by generating two-dimensional diffraction patterns on the beam scanning element;

3. By carefully selecting the focal of the output lens, it is possible to design a 60 degree field of steering angle, independent of the maximum diffraction angle of the diffractive elements which are generally limited to a few degrees;

4. The beam steering concept is compatible with conformal windows on aircraft;

5. To have an overall >75% (−1.25 dB) optical transmission efficiency, the target efficiency of the individual diffraction devices must be higher than 86% (−0.625 dB). This can be achieved with an electronic diffraction device that displays a discretized blazed grating, as discussed below; and 6. A sub millisecond reconfiguration time can be achieved with a MEMS type SLM device, known to demonstrate an approximately 3.8 μs reconfiguration time (see FIG. 6; Yoo et al., in Optics Express, v. 22, no. 16, 19029-19039, 11 Aug. 2014).

The above-described target operational characteristics of the system of the invention can be assessed in light of parameters of conventionally-configured devices and systems, as discussed below.

Conventional Device Configurations.

Of the two types of electronic diffractive devices that are commercially available at the moment (the one referred to as LCoS and the other referred to as MEMS), the operation of the LCoS systems is based on a per pixel modulation of the index of refraction by phase retardation.

MFMS (such as DMD devices manufactured by Texas Instruments and Sony, among others; example being a DLP™) are structured around micro-mirrors that can be flipped left or right at an approximately 12° angle. Due to the mode of operation of its micro-mirror, the DLP™ can only display amplitude binary holographic patterns. In this case the modulation M(x) can be expressed as $$M(x) = M_0 + \frac{2\Delta M}{\pi} \sum_{m=1}^{\infty} \frac{\sin[(2m-1)Kx]}{2m-1} \qquad (3)$$

$$= M_0 + \frac{\Delta M}{\pi} \sum_{m=1}^{\infty} \frac{\exp[i(2m-1)Kx] + \exp[-i(2m-1)Kx]}{2m-1}$$

According to the Fourier decomposition of Eq. 3, the efficiency of diffraction provided by the device in the +/−1 orders is given by:

$$\eta_{\pm 1} = [\Delta M/\pi]^2 \leq 10.1\% \qquad (4)$$

A person of skill in the art will readily appreciate that Eq. (4) provides for a maximum at about 10% efficiency, leading to a minimum loss of about 10 dB for the implementation utilizing the DMD device. This evidences, therefore, that the use of a DMD-based beam steering device is not likely to satisfactorily achieve the target efficiency value of 86% or higher.

Figure 7A:
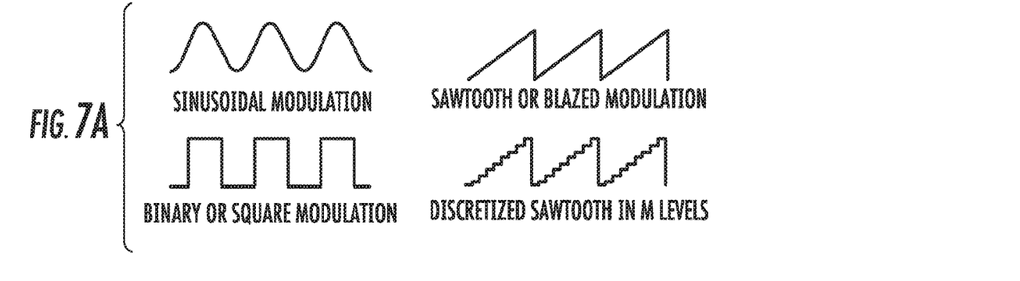
FIGS. 7A, 7B illustrate diffraction efficiency for different types of diffractive structures operated by changes in amplitude and/or phase.

An LCoS device, on the other hand, is configured to modulate the phase of light instead of its amplitude. As such, the LCoS device can operate to display a discretized saw tooth pattern of amplitude ΔM, with in discretized levels (as shown in FIG. 7A). The phase modulation can be expressed as $$M(x) = \exp\left(\frac{-i\pi Kx}{m}\right)\frac{\sin(\pi x/m)}{\pi Kx/m}\frac{1}{m}\sum_{k=0}^{m-1}\exp\left[-i2\pi\left(Kx - \frac{\Delta M}{2}\right)k/m\right] \qquad (5)$$

The diffraction efficiency, assessed based on Fourier decomposition of the modulation pattern of Eq. (5) is given by:

$$\eta_{=1} = \left[\frac{\sin\left(\pi\left(1 - \frac{\Delta M}{2}\right)\right)}{\pi} \frac{\sin\left(\frac{\pi}{m}\right)}{\sin\left(\frac{\pi}{m}\left(1 - \frac{\Delta M}{2}\right)\right)}\right]^2 \quad (6)$$

For ΔM=2, one obtains $$\eta_{=1} \approx \operatorname{sinc}^2\left(\frac{1}{m}\right) \leq 100\% \quad (7)$$

Figure 7B:
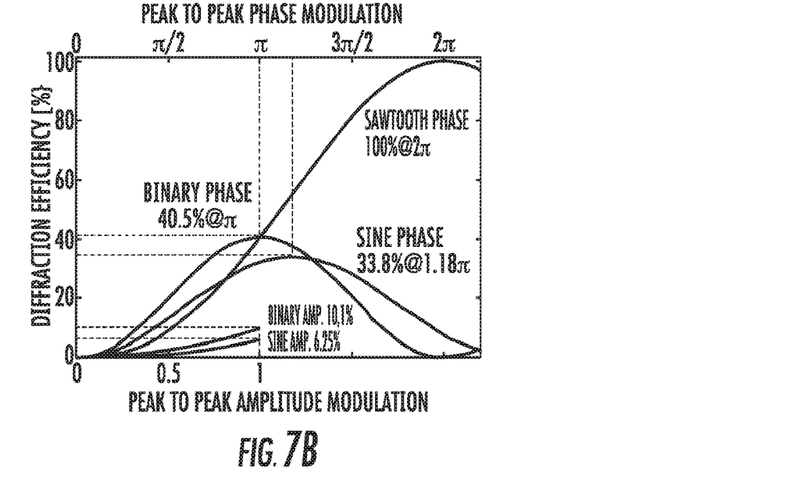

The levels or values of diffraction efficiency that can be obtained the use of the binary-amplitude modulators such as DMD or multilevel phase modulators such as LCoS for different modulation formats (sinus, square, saw tooth, for example) and corresponding types of modulation (amplitude or phase) are summarized in FIG. 7B. Based on the summary, a person of skill in the art will readily appreciate that to ensure the operational efficiency that is greater than 40%, a multilevel (with a number of levels of at least 3) phase modulator is required.

Figure 8:
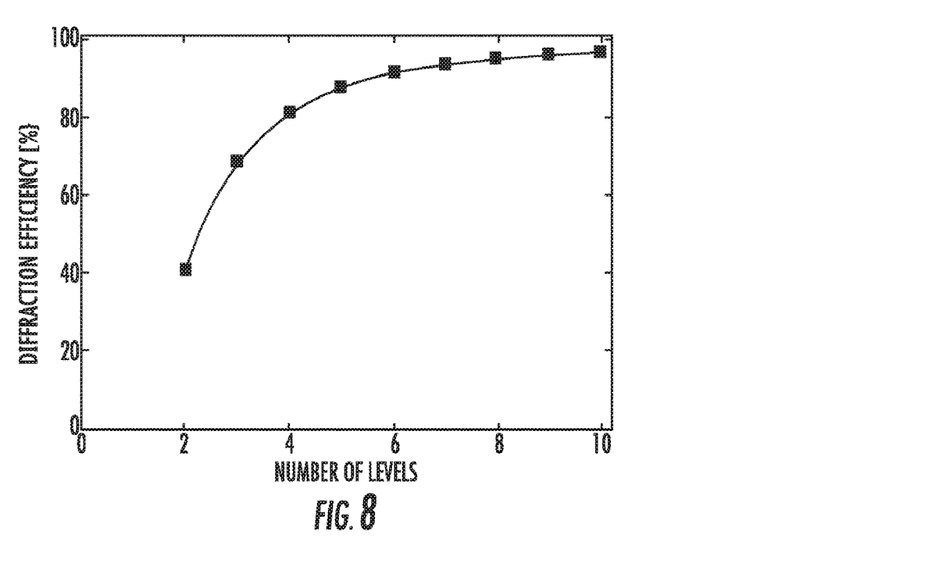
FIG. 8 illustrates diffraction efficiency that can be achieved with a phase-modulating MEMS device as a function of the number of phase levels available between the extreme values of operational characteristic of such device (for a saw-tooth or blazed implemented changes between available phase levels)

From Eq. (7) it can also be seen that for an efficiency of at least 86% (see Eq. (5) and FIGS. 7A, 7B), the number of levels iv representing the modulation should be greater than or equal to 5, which is achievable with the use of an LCoS-based phase-modulation MEMS device. The evolution of the modulation according to the number of discretized levels between the extrema of the working range (or phase values between the phases corresponding to such extrema) with which a pixel of the LCoS can be associated during the operation is presented in FIG. 8. Considering that the binary device is capable of reaching only about 40% efficiency, the use of a system capable of operating at a larger number of levels is preferred.

While LCoS devices are operationally sufficient in terms of diffraction efficiency, they may not necessarily possess a fast enough refresh rate that the device of the invention is attempting to achieve. The term "refresh rate" is defined as a number of frames the SLM can display per second. In operation of the disclosed embodiments, the refresh rate defined the number of distinct locations to which the scanning beam cans be sent/directed every second (for example, the refresh rate of 10 Hz implies that the operation of the device can accommodate 10 targeted locations per second). The reconfiguration time of liquid crystal, for example, remains limited to the millisecond range due to the relaxation time governed by the viscoelastic reorganization of the molecules: the fastest of the known LCoS devices have a refresh rate of only hundreds of Hz for nematic liquid crystals, and up to 1000 Hz for ferroelectric phase.

Other beam steering technologies such as those based on the use of acousto-optic (AO) crystals, liquid crystal (LC) layer(s), or silicon waveguide(s) may be in a position to meet some of the targeted requirements. In the case of these types of a light-beam-scanner system, however, the useable output aperture is on the order of 1 mm² or smaller, thereby resulting in a system where the amount of collected light is impractically low and the signal-to-noise ratio is too low (in some cases, lower than unity) to be used in high performance imaging applications.

It is appreciated, therefore, that the DMD based SLM system is sufficiently fast but introduces too high optical losses, while the LCoS based SLM system is efficient in terms of light-throughput but suffers from a shortcoming of low operational speed (rate). Other technologies, when implemented, provide too small of an output aperture.

Embodiments of the present invention address both the speed and aperture size requirements. In one example, an embodiment of the invention is configured around the use of a phase-modulating MEMS-based SLM. A phase-modulating MEMS device of interest would generally be configured to reposition a light-reflecting unit or surface or pixel (that forms a constituent element of the MEMS device) with respect to its stationary or reference position. A specific non-limiting example of such phase-modulating MEMS device is presented in FIGS. 3A, 3B, 3C. In this case, the phase of light diffracted from the active surface of the device is modulated by repositioning of the individual micro-mirror reflectors, in a piston-fashion, along a direction that is transverse to the surface of the device, creating a highly efficient discretized saw tooth pattern at kHz refresh rate. The diffraction efficiency is similar to that of the LCoS device as discussed above, while the speed of operation is similar to that of a DMD device (on the order of or approximately equal to a microsecond). The SLM-based device therefore combines the advantages of the two existing systems. Manufactured at a CMOS foundry, a piston SLM array device may include 1024 individual piston mirrors that can be moved up and down by electrostatic actuation.

In one embodiment, the device 300 (shown with different magnifications in FIGS. 3A, 3B, 3C) may use an array of ultra-lightweight mirrors (~400 nm thickness). With the use of sub-wavelength diffraction gratings, configured from multiplicity of individual micro-mirror reflectors of the device, the "high-contrast grating" (HCG) mirror into which the surface of the device 300 exhibits high reflectivity (>99%) at 1550 nm wavelength and over a wide wavelength range. These mirrors are 40× lighter than conventional mirrors, enabling us to demonstrate the fastest SLM phase array. The measured response time is only 3.8 μs, as discussed above, which value matches well with the measured mechanical resonance frequency of 0.42 MHz. This specific phase array has a pitch of 22 μm and a fill factor of 85%, which produces a total field of view (TFOV) of +/−2° and an instantaneous field of view (beam width) of 0.14°.

It is appreciated, therefore, that an implementation of the idea of the invention may employ a pixelated phase modulator such as a spatial light modulator, configured as either an LCoS-based or a MEMS-based modulator. An SLM is commercially available in a variety of sizes, is a robust, commercial-off-the-shelf (COTS) component composed of millions of pixels that individually modulate the phase of the incident beam. The scanning technique consists of displaying a computer generated hologram (CGH) pattern on the SLM that diffracts the incoming signal in a specific direction. The CGH does not need to be computed on the fly, and can more efficiently be stored in the memory of the SLM controller and retrieved in sequence, increasing the sweep speed. To minimize the noise present in the far field diffracted beam, the CGHs are computed using a series of iterative Fourier transforms such as in the Gerchberg-Saxton algorithm. In such an algorithm, the result of the nth iteration is used along with the ideal intensity distribution to calculate the n+1th aperture function. The inventors developed a specific computer algorithm that has been proven efficient in previous applications. This diffractive approach works in a bidirectional configuration since the signal scattered from the target is always redirected by the same CGH toward the source. The signal can then be directed by a beam splitter toward the detector. When the scanning angle is changed by displaying a new CGH pattern, the diffracted angle of the back scattered signal is similarly modified by the CGH, compensating for the beam redirection, and returning the signal toward the source and detector.

In addition to the large aperture of the SLM, there are many advantages to adopting the disclosed diffraction-based technique to achieve the implementation of the invention, among which there are the following:

According to the methodology disclosed herein, the beam-scanning pattern is not restricted and can be defined by the user. In particular, an embodiment of invention allows for the beam to be re-directed to a next target within the aperture window from the current target (that is, be sent in another direction from the currently-defined direction) in a discrete fashion, without a need to spatially-continuously move the beam: the beam can be caused to "jump" from one target to another. Furthermore, the beam-scanning implemented with the disclosed methodology it is not limited to a simple raster scan (as it is the related-art case with gimbal mounted mirrors. Similarly, the sampling interval can be changed arbitrarily along any one or both directions of the scan. These advantages allow the user to change the scanning pattern or manner in accord with the information received by the LIDAR system ahead of time. For example, the spatially-coarse (that is, with large dimensional increments) beam scanning can be employed, followed by the spatially-fine (that is, with smaller dimensional increments) scanning in specific areas of space, optionally with the use of a compressive sensing algorithm.

The diffracted beam can be spatially divided into multiple sub-beams, thereby allowing for structured illumination for multiplexing applications.

The system is robust to single or multiple scattered pixel failures. As is well recognized in the art, for a gimbal mounted scanner, the loss of a constituent mirror element equates to the loss of the entire system. In contradistinction, for a scanner of the invention, the loss of one active element of the SLM, only fractionally reduces the efficiency of the system. The degree of reduction of the efficiency can be calculated, in first approximation, as the ratio of the number of faulty pixels of the scanner to the number of active elements on the SLM (the latter being on the order of $10^6$).

The large device area (typically, about several $cm^2$; 25.6× 15.4 $mm^2$ for the Holoeye LC-R 720 LCoS, 14×10 $mm^2$ for the TI 0.7" XGA DMD) facilitates the use of high-power beams (Here, to prove the operability of the embodiment of the invention, the TI DMD device was tested at energies up to 20 mJ/pulse at a wavelength of 532 nm, with a 6 ns pulse duration).

Low power consumption (at least in comparison with the opto-acoustic modulator): the SLM chip has an overall wall-plug power consumption of 20.8 W at maximum refresh rate (which includes the power consumed by the control electronics).

The SLM has a small form factor of only a few $cm^2$ front aperture with a few mm thickness (25.6×15.4×3 $mm^3$ for the Holoeye LC-R 720 LCoS, in a specific example).

Embodiments of the invention utilize a different type of SLM: -binary (DMD) as opposes to multilevel type of phase modulator (such as an 8-bit LCoS)

A specific type of the micro-mirror device is used (DMD). With DMD, the phase modulation is provided by movement of small SLM micro-mirrors, spaced on a grid with a 10 micron pitch. The small size of the mirrors allows for a frame refresh rate of tens of kHz.

In one implementation, the employed DMD device is characterized by

Aperture of: 1.05×1.40 $cm^2$.
Addressable display: 1024×768 pixels.
Mirror pitch: 13.68 microns.
Frame refresh rate: 22.727 kHz.
Micromirror Reflectivity 88%.
Array Diffraction Efficiency of at least 86%.
Array Fill Factor 92%.
1550 nm antireflection coating available.
40.6×31.8×6.0-mm Package footprint.
High reliability: no hinges failure to over $10^{12}$ (1 trillion) cycles.
Low cost For the purposes of this disclosure and accompanying claims, and unless otherwise stated, a real-time performance of a system is understood as performance which is subject to operational deadlines from a given event to a system's response to that event. For example, a real-time extraction of sought-after information (such as optical data) from an optical data buffer of a tangible, non-transitory storage medium may be one triggered by the system itself or a user and executed simultaneously with and without interruption of an optical data acquisition process during which such optical data have been recorded.

Unless explicitly indicated otherwise, the term "a degree of divergence" is used herein to refer to an angular measure of either the increase or decrease in beam diameter or radius with distance from the optical aperture or antenna aperture from which the electromagnetic beam emerges. This term, therefore, addresses the full angle of beam's divergence or convergence in space. A degree of divergence of a perfectly collimated beam is considered to have a value of zero, while a degree of divergence of a converging beam has a negative value. The degree of divergence of a spatially-diverging beam is, therefore, positive. A beam is defined as substantially collimated, when the modulus of the value of the degree of divergence does not exceed 3 degrees, preferably 1 degrees, more preferably 1 degree, even more preferably 0.5 degree, and most preferably 0.1 degree.

Figure 9:
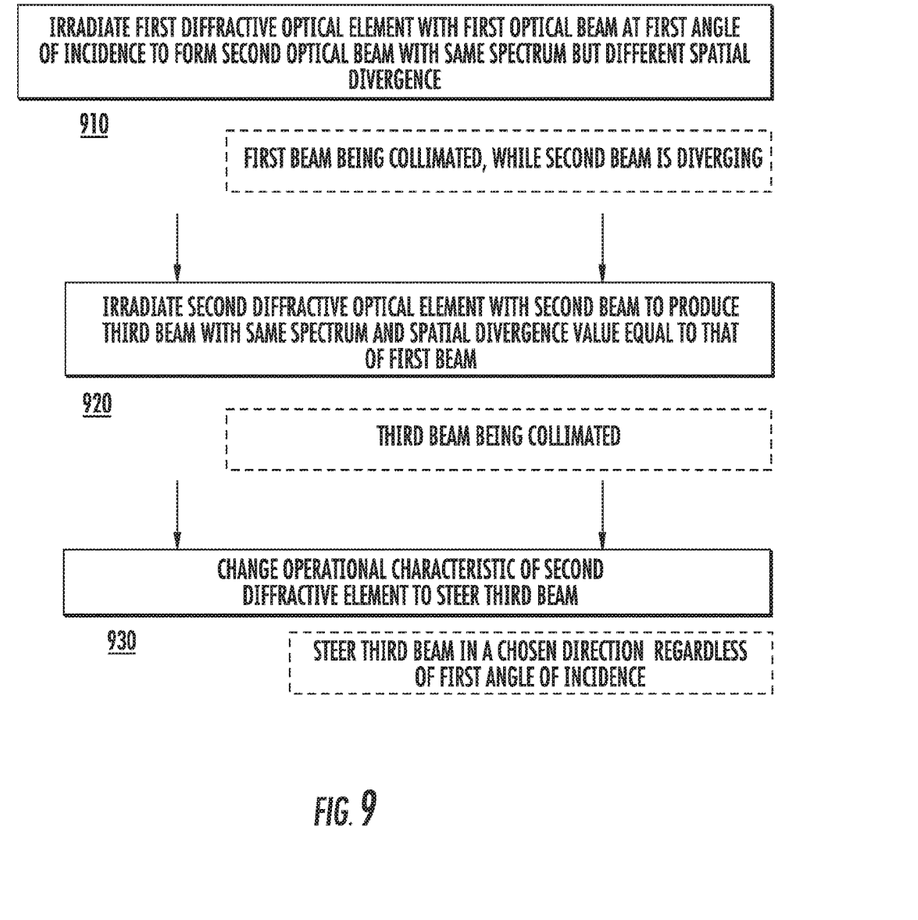
FIG. 9 provides a flow-chart representing an embodiment of a method according to the idea of the invention.

As an example, FIG. 9 presents a flow-chart illustrating the operation of an embodiment of the invention.

Here, the process of transmitting light through an optical system of the invention includes a step 910 of impinging a first polychromatic light beam (having corresponding first degree of collimation—or, alternatively, degree of divergence or convergence in space—and first optical spectrum) onto a first diffractive element that produces, as a result of diffraction of light at the first diffractive element, a second polychromatic light beam having its own optical spectrum and degree to which it is collimated. (In a specific case, the second beam is formed to spatially diverge while the first beam is collimated.) When the spectra of the first and second beams are substantially the same, at this step 910, a degree of collimation (or, alternatively, a degree of spatial divergence or convergence) of a polychromatic light beam is changed by forming, as a result of diffraction of the light beam on a diffractive optical element, a first light output containing light at substantially all wavelengths present in the spectrum of the polychromatic light beam.

The so-formed second beam is further propagated through the system and is directed towards the second diffractive optical element, step 910, at which such second beam diffracts to form a third polychromatic beam, the degree of spatial divergence of which is substantially equal to that of the first beam incident on the first element. (In a specific case, both the first and third beams are collimated.) During so-transmitting light through the system of the invention, at least one operational characteristic of the second diffractive element is varied, at step 930 (optionally—according to a pre-determined program and/or control by a programmable computer processor) to ensure that the third beam is steered in space according to a pre-determined trajectory. Non-limiting examples of an operational characteristic of the diffractive element include (an optionally position-dependent) period of the diffraction grating associated with the diffractive element; mutual position and/or orientation of constituent individual elements of the diffractive element (such as in case of the phase-modulating version of MEMS device configured as a diffractive element for use in an embodiment of the invention); and spatial orientation of the diffractive device with respect to a light beam incident onto the diffractive device.

In one specific embodiment, the system is configured such that—while first angle of incidence may be changed (that is, the first beam may be steered)—the direction of diffraction of the second beam on the second element is such that the third beam is directed along a pre-determined axis regardless of the intentional/unintentional variations of the first diffraction angle. During the operation of this specific embodiment, and under conditions that the optical spectrum of the first and third beams are substantially the same, the second light output from the system (in a form of the third beam) is formed in which light at any wavelength is caused to propagate in the same direction with respect to the pre-determined axis. The axis can be chosen to coincide with the normal to an active (that is, interacting with light) surface of the second diffractive optical element.

It is appreciated that in a specific case when each of the first and second diffractive optical elements of the system are configured to operate by modifying phase of light incident onto such element, the method of invention may additionally include a step of dynamically verifying a distribution of phase across a wavefront of a light beam diffracted at a given diffractive optical element (as compared to a wavefront of light incident onto this diffractive element) by dynamically varying some geometrical characteristic of the diffractive optical element in real time. Examples of geometrical characteristic that are subject to such pre-determined change include but are not limited to: position and/or orientation of a chosen constituent reflector from an array of reflectors with respect to position and/or orientation of neighboring constituent reflectors; a spatial period of diffraction grating defined or formed by a surface of a MEMS-device; and the index of refraction or polarization vectors direction of a liquid crystal on silicon cell. In one example, at this step at least one micro-reflector from the array of reflector comprising the diffractive optical device is moved or repositioned between first and second spatial positions/orientations by, for example, tangentially-parallel translation of such micro-reflector along a chosen reference axis.

The operation of the system of the invention can be controlled with a programmable processor controlled by instructions stored in a memory. Such programmable processor in this case is operably coordinated with at least one of the first and second diffractive optical devices to govern their operation, as well as an optical detection unit (not shown in Figures) positioned to acquire light that has interacted with a given diffractive optical device. The memory may be random access memory (RAM), read-only memory (ROM), flash memory or any other memory, or combination thereof, suitable for storing control software or other instructions and data. Those skilled in the art should also readily appreciate that instructions or programs defining the functions of the present invention may be delivered to a processor in many forms, including, but not limited to, information permanently stored on non-writable storage media (e.g. read-only memory devices within a computer, such as ROM, or devices readable by a computer I/O attachment, such as CD-ROM or DVD disks), information alterably stored on writable storage media (e.g. floppy disks, removable flash memory and hard drives) or information conveyed to a computer through communication media, including wired or wireless computer networks. In addition, while the invention may be embodied in software, the functions necessary to implement the invention may optionally or alternatively be embodied in part or in whole using firmware and/or hardware components, such as combinatorial logic, Application Specific Integrated Circuits (ASICs), Field-Programmable Gate Arrays (FPGAs) or other hardware or some combination of hardware, software and/or firmware components.

For the purposes of this disclosure and the appended claims, the use of the terms "substantially", "approximately", "about" and similar terms in reference to a descriptor of a value, element, property or characteristic at hand is intended to emphasize that the value, element, property, or characteristic referred to, while not necessarily being exactly as stated, would nevertheless be considered, for practical purposes, as stated by a person of skill in the art. These terms, as applied to a specified characteristic or quality descriptor means "mostly", "mainly", "considerably", "by and large", "essentially", "to great or significant extent", "largely but not necessarily wholly the same" such as to reasonably denote language of approximation and describe the specified characteristic or descriptor so that its scope would be understood by a person of ordinary skill in the art. In one specific case, the terms "approximately", "substantially", and "about", when used in reference to a numerical value, represent a range of plus or minus 20% with respect to the specified value, more preferably plus or minus 10%, even more preferably plus or minus 5%, most preferably plus or minus 2% with respect to the specified value. As a non-limiting example, two values being "substantially equal" to one another implies that the difference between the two values may be within the range of +/−20% of the value itself, preferably within the +/−10% range of the value itself, more preferably within the range of +/−5% of the value itself, and even more preferably within the range of +/−2% or less of the value itself.

The use of these terms in describing a chosen characteristic or concept neither implies nor provides any basis for indefiniteness and for adding a numerical limitation to the specified characteristic or descriptor. As understood by a skilled artisan, the practical deviation of the exact value or characteristic of such value, element, or property from that stated falls and may vary within a numerical range defined by an experimental measurement error that is typical when using a measurement method accepted in the art for such purposes.

For example, a reference to an identified vector or line or plane being substantially parallel to a referenced line or plane is to be construed as such a vector or line or plane that is the same as or very close to that of the referenced line or plane (with angular deviations from the referenced line or plane that are considered to be practically typical in related art, for example between zero and fifteen degrees, preferably between zero and ten degrees, more preferably between zero and 5 degrees, even more preferably between zero and 2 degrees, and most preferably between zero and 1 degree). For example, a reference to an identified vector or line or plane being substantially perpendicular to a referenced line or plane is to be construed as such a vector or line or plane the not meal to the surface of which lies at or very close to the referenced line or plane (with angular deviations from the referenced line or plane that are considered to be practically typical in related art, for example between zero and fifteen degrees, preferably between zero and ten degrees, more preferably between zero and 5 degrees, even more preferably between zero and 2 degrees, and most preferably between zero and 1 degree). A line that is transverse to a given plane is situated across such given plane. A term "substantially-rigid", when used in reference to a housing or structural element providing mechanical support for a contraption in question, generally identifies the structural element that rigidity of which is higher than that of the contraption that such structural element supports. As another example, the use of the term "substantially flat" in reference to the specified surface implies that such surface may possess a degree of non-flatness and/or roughness that is sized and expressed as commonly understood by a skilled artisan in the specific situation at hand.

A reference to "substantially equal" spectra defines first and second optical spectra the frequency content of which is the same, while the amplitudes of radiation at the same frequency may optionally differ from one another (as in the case when, for example, the second spectrum represents an attenuated version of the first spectrum).

Other specific examples of the meaning of the terms "substantially", "about", and/or "approximately" as applied to different practical situations may have been provided elsewhere in this disclosure.

Disclosed aspects, or portions of these aspects, may be combined in ways not listed above. Accordingly, the invention should not be viewed as being limited to the disclosed embodiment(s).

The invention claimed is:

1. A method for relaying a light beam through an optical system, the method comprising:
    impinging a first polychromatic light beam having a first degree of divergence and a first wavelength spectrum onto a first diffractive element to produce a second polychromatic light beam having a second degree of divergence and a second wavelength spectrum, the second degree of divergence being different from the first degree of divergence, the first and second wavelength spectra being substantially equal; and
    causing said second polychromatic light beam to interact with a second diffractive element to form a third polychromatic light beam having a third wavelength spectrum and a third degree of divergence, the second and third wavelength spectra being substantially equal, the first and third degrees of divergence in space being substantially equal.

2. The method according to claim 1, wherein the impinging includes
    receiving a substantially collimated first polychromatic light beam at the first diffractive element, and
    forming, from the substantially collimated first polychromatic light beam, the second polychromatic light beam that is spatially diverging.

3. The method according to claim 1, wherein said interacting includes producing the third polychromatic light beam that is substantially collimated.

4. The method according to claim 1, further comprising changing an operational characteristic of the second diffractive element to spatially steer the third polychromatic light beam.

5. The method according to claim 4, wherein the changing includes changing the operational characteristic of the second diffractive element to spatially steer the third polychromatic light beam while keeping said third polychromatic light beam substantially collimated, the third polychromatic light beam containing light at multiple wavelengths.

6. The method according to claim 1, further comprising causing a change in an angular direction of propagation of the third polychromatic beam, while keeping the third polychromatic beam substantially collimated, by spatially chirping a period of a diffraction grating formed at the second diffractive element.

7. The method according to claim 6, wherein said causing includes causing the third polychromatic beam change its angular direction of propagation in a spatially-discreet fashion.

8. The method according to claim 1, wherein the causing to interact includes
    while spatially steering said first polychromatic light beam, forming said third polychromatic light beam that is directed along an axis that is transverse to an output surface of the second diffractive element regardless of an angle of incidence of the first polychromatic light beam onto the first diffractive element.

9. The method according to claim 1, wherein the causing said second polychromatic light beam to interact with the second diffractive element includes
    while spatially steering said first polychromatic light beam, forming said third polychromatic light beam that is directed along an axis that is substantially perpendicular to an output surface of the second diffractive element regardless of an angle of incidence of the first polychromatic light beam onto the first diffractive element.

10. The method according to claim 1, wherein any of said first and second diffractive elements includes a two-dimensional (2D) array of micro-reflectors, wherein an operation of each of said micro-reflectors is defined by discrete spatial orientations of such micro-reflector.

11. The method according to claim 10, comprising impinging light onto at least one of the first and second diffractive elements while activating the 2D array of micro-reflectors that form a surface of said at least one of the first and second diffractive elements, to define a chirped diffraction grating at said at least one of the first and second diffractive elements.

12. The method according to claim 1, wherein one of said first and second diffractive elements is configured as a chirped diffraction grating.

13. The method according to claim 1, wherein said relaying includes relaying light through a monostatically-configured system.

* * * * *